(12) United States Patent
Woytowitz et al.

(10) Patent No.: US 8,700,222 B1
(45) Date of Patent: Apr. 15, 2014

(54) IRRIGATION CONTROLLER WITH SELECTABLE WATERING RESTRICTIONS

(75) Inventors: Peter J. Woytowitz, San Diego, CA (US); Gregory R. Hunter, Solana Beach, CA (US)

(73) Assignee: Hunter Industries, Inc., San Marcos, CA (US)

( * ) Notice: Subject to any disclaimer, the term of this patent is extended or adjusted under 35 U.S.C. 154(b) by 761 days.

(21) Appl. No.: 12/042,301

(22) Filed: Mar. 4, 2008

(51) Int. Cl.
*G05D 11/00* (2006.01)
(52) U.S. Cl.
USPC ............................................ 700/284; 700/19
(58) Field of Classification Search
USPC ............................... 700/281–284, 19
See application file for complete search history.

(56) References Cited

U.S. PATENT DOCUMENTS

| | | | |
|---|---|---|---|
| 5,097,861 A | 3/1992 | Hopkins et al. | 137/78.3 |
| 5,124,942 A | 6/1992 | Nielsen et al. | 395/100 |
| 5,251,153 A | 10/1993 | Nielsen et al. | 364/550 |
| 5,444,611 A | 8/1995 | Woytowitz et al. | 700/16 |
| 5,748,466 A | 5/1998 | McGivern et al. | 364/146 |
| 5,870,302 A | 2/1999 | Oliver | 700/11 |
| 6,088,621 A | 7/2000 | Woytowitz et al. | 700/16 |
| 6,098,898 A | 8/2000 | Storch | 239/69 |
| 6,298,285 B1 | 10/2001 | Addink et al. | 700/284 |
| 6,823,239 B2 | 11/2004 | Sieminski | 700/284 |
| 6,842,667 B2 | 1/2005 | Beutler et al. | 700/284 |
| 6,895,987 B2 | 5/2005 | Addink et al. | 137/78.3 |
| 7,010,395 B1 * | 3/2006 | Goldberg et al. | 700/284 |
| 7,133,749 B2 | 11/2006 | Goldberg et al. | 700/284 |
| 7,844,368 B2 * | 11/2010 | Alexanian | 700/284 |
| 2008/0154437 A1 | 6/2008 | Alexanian | 700/284 |
| 2009/0043427 A1 | 2/2009 | Addink | 700/284 |

OTHER PUBLICATIONS

"Smart Dial Controller User's Guide", Irritrol Systems, Oct. 2006.*
Southern Nevada Water Authority (SNWA) Technical Specifications Bid No. 2102-07, Aug. 2008.
Hunter Industries, Inc., IMMS Owners Manual Software Guide, Jun. 2004.
Hunter Industries, Inc., Pro-C Owners Manual and Installation Guide, Mar. 2006.

* cited by examiner

*Primary Examiner* — Carlos Ortiz Rodriguez
(74) *Attorney, Agent, or Firm* — Knobbe, Martens, Olson & Bear LLP (57) ABSTRACT

An irrigation controller includes a processor and a memory that either forms a part of the processor or is connected to the processor. A plurality of manually actuable controls allow a user to enter a watering program into the memory or select a watering program stored in the memory. Circuitry is controlled by the processor for turning corresponding valves ON and OFF in accordance with the watering program. Programming stored in the memory implements predetermined watering restrictions that disable portions of the watering otherwise effectuated by the watering program.

19 Claims, 4 Drawing Sheets

---

Access Special Water Restriction Settings Mode

Select Programs to be effected by restricted watering

Select appropriate restriction mode from variety of options

Select from a predetermined set of restrictions

Exit Watering Restriction mode

IRRIGATION CONTROLLER WITH SELECTABLE WATERING RESTRICTIONS

FIELD OF THE INVENTION

The present invention relates to irrigation controllers that turn a plurality of valves ON and OFF to water residential and commercial landscaping.

BACKGROUND

Because water conservation is becoming ever more important, there are currently many water districts that restrict when irrigation can occur. As used hereafter, the term "water district" includes any private, governmental or quasi-governmental agency or any other entity that has the authority to mandate landscape watering restrictions. Many water districts across the United States are expected to implement landscape watering restrictions in the future. These watering restrictions can include even or odd calendar days, days of the week like Monday, Wednesday, and Friday. or Tuesday, Thursday. Saturday, and watering intervals. By way of further example, the Southern Nevada Water Authority (SNWA) does not permit landscape watering between 11:00 a.m. and 7:00 p.m. from May 1 to September 30. This is because it is well known that more water is wasted if landscape watering occurs during the hottest part of the day, particularly in late Spring, Summer and early Fall. As used herein, the term "watering restrictions" refers to any prohibitions or limits on landscape watering imposed by a water district, including days and times, which may or may not vary seasonally.

If watering restrictions are not too complex, it is possible, though tedious, for a user to program a residential or commercial irrigation controller so that the watering executed by the controller complies with the watering restrictions. Many cities are imposing fines if irrigation occurs outside of the restricted days and times.

Some water districts are mandating much more complex watering restrictions. These include restrictions that change during the year with seasonal changes including changing the days that watering is allowed, and making this change multiple times a year, changing what hours watering is allowed, and changing this multiple times each year, but not necessarily every time the days-to-water changes. As an example, the SNWA currently has six different watering groups (A-F) to which its customers have been assigned. Each customer must manage its irrigation to comply with the particular set of watering restrictions it has been assigned. Each one of the assigned set of watering restrictions changes four times through the year based on seasonal needs. The changes in each schedule include the days on which watering can occur. The changes in each set of watering restrictions may also include the hours during which watering is allowed to occur. There are also exemptions to these watering restrictions. For example, new lawns and new plants are exempt to allow them time to get established and therefore need to be managed separately. Drip irrigation also has different guidelines and may be managed independently of any watering restrictions.

Electronic irrigation controllers used in conjunction with residential and commercial landscaping typically execute watering programs that turn various zones or stations ON and OFF throughout the week in accordance with pre-programmed run and cycle times. As used herein, the term "watering program" refers to any set of instructions selected and/or defined by a user that are executed by a processor to accomplish the foregoing watering of turf, plants and other landscaping. In order for water users to comply with complex watering restrictions, and also maintain the health of their landscape, they need to re-program their conventional irrigation controllers four times per year so that the watering effectuated by its watering program complies with the watering restrictions. Some homeowners make an effort to re-program their controllers every few weeks to accommodate these restrictions. Most homeowners do not have the patience or ability to understand their irrigation needs well enough to do this. Many lack the technical skills to re-program their irrigation controllers to modify their watering programs so that they comply with complex watering restrictions. In some geographic locations, such as Scottsdale, Ariz., some homeowners only occupy their property on a seasonal basis, which increases the challenges for them to comply with watering restrictions. The only current option for homeowners and property owners who lack the skills to re-program their irrigation controllers in a complex manner is to hire an experienced irrigation expert to re-program their systems four times each year at their expense. Thus the growing population and depleting natural resources have created a need for a more convenient and reliable way of complying with watering restrictions.

SUMMARY OF THE INVENTION

In accordance with an embodiment of the present invention, an irrigation controller includes a processor and a memory that either forms a part of the processor or is connected to the processor. A plurality of manually actuable controls allow a user to enter a watering program into the memory or select a watering program stored in the memory. Circuitry is controlled by the processor for turning corresponding valves ON and OFF in accordance with the watering program. Programming stored in the memory implements predetermined watering restrictions that disable portions of the watering otherwise effectuated by the watering program.

In accordance with another embodiment of the present invention, an irrigation management system includes a computer connected to least one irrigation controller on an irrigation site having a processor that turns a plurality of valves located on the irrigation site ON and OFF in accordance with a watering program stored in the irrigation controller. A communications link connects the computer and the irrigation controller such that the computer may be at a location other than the irrigation site. Programming executable by the computer implements predetermined watering restrictions that disable portions of the watering otherwise effectuated by the watering program stored in the irrigation controller.

In accordance with another aspect of the present invention a method is provided for watering turf and/or landscaping that conserves water. The method includes the steps of providing an irrigation controller having a plurality of manually actuable controls; entering or selecting a watering program via the manually actuable controls; selecting pre-programmed watering restrictions via the manually actuable controls that disable portions of the watering otherwise effectuated by the watering program; and watering turf and/or landscaping by having a processor in the irrigation controller turn a plurality of valves ON and OFF in accordance with the watering program as inhibited by the selected watering restrictions. The watering restrictions can be selected before or after the watering program is entered or selected.

DETAILED DESCRIPTION

The entire disclosures of the following U.S. patents and applications are hereby incorporated by reference: U.S. Pat. No. 5,097,861 granted Mar. 24, 1992 of Hopkins et al. entitled IRRIGATION METHOD AND CONTROL SYSTEM; U.S. Pat. No. 5,444,611 granted Aug. 22, 1995 of Peter J. Woytowitz, et al. entitled LAWN AND GARDEN IRRIGATION CONTROLLER; U.S. Pat. No. 5,829,678 granted Nov. 3, 1998 of Richard E. Hunter et al. entitled SELF-CLEANING IRRIGATION REGULATOR VALVE APPARATUS; U.S. Pat. No. 6,088,621 granted Jul. 11, 2000 also of Peter J. Woytowitz et al. entitled PORTABLE APPARATUS FOR RAPID REPROGRAMMING OF IRRIGATION CONTROLLERS; U.S. Pat. No. 6,721,630 granted Apr. 13, 2004 also of Peter J. Woytowitz entitled EXPANDABLE IRRIGATION CONTROLLER WITH OPTIONAL HIGH-DENSITY STATION MODULE; U.S. Pat. No. 6,842,667 granted Jan. 11, 2005 of Beutler et al. entitled POSITIVE STATION MODULE LOCKING MECHANISM FOR EXPANDABLE IRRIGATION CONTROLLER; U.S. patent application Ser. No. 10/883,283 filed Jun. 30, 2004 also of Peter J. Woytowitz entitled HYBRID MODULAR/DECODER IRRIGATION CONTROLLER, now U.S. Pat. No. 7,069,115 granted Jun. 27, 2007; pending U.S. patent application Ser. No. 10/985,425 filed Nov. 9, 2004 also of Peter J. Woytowitz et al. and entitled EVAPOTRANSPIRATION UNIT CONNECTABLE TO IRRIGATION CONTROLLER; U.S. patent application Ser. No. 11/045,527 filed Jan. 28, 2005 also of Peter J. Woytowitz entitled DISTRIBUTED ARCHITECTURE IRRIGATION CONTROLLER, now U.S. Pat. No. 7,245,991 granted Jul. 17, 2007; U.S. Pat. No. 7,289,886 of Peter J. Woytowitz granted Oct. 30, 2007 entitled MODULAR IRRIGATION CONTROLLER WITH SEPARATE FIELD VALVE LINE WIRING TERMINALS; U.S. Pat. No. 7,225,058 of Lamonte D. Porter granted May 29, 2007 entitled MODULAR IRRIGATION CONTROLLER WITH INDIRECTLY POWERED STATION MODULES; and pending U.S. patent application Ser. No. 11/458,551 filed Jul. 19, 2006 of Lamonte D. Porter et al. entitled IRRIGATION CONTROLLER WITH INTERCHANGEABLE CONTROL PANEL. The aforementioned U.S. patents and applications are all assigned to Hunter Industries, Inc., the assignee of the subject application.

In one embodiment of the present invention a stand-alone irrigation controller that allows a user to select a watering program in a conventional manner and includes additional functions that enable the watering program that has been selected by the user to be automatically inhibited throughout the year to meet complex watering restrictions imposed by a water district in which the irrigation controller has been installed. Programming stored in the memory of the irrigation controller implements predetermined watering restrictions that disable portions of the watering otherwise effectuated by the watering program.

Figure 1:
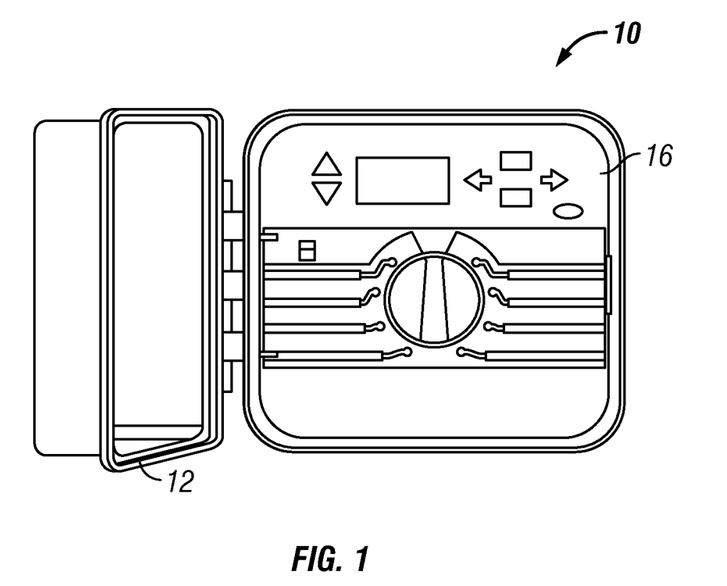
FIG. 1 illustrates an embodiment of an irrigation controller in accordance with the present invention with its front door open to reveal its removable face pack.
Figure 2:
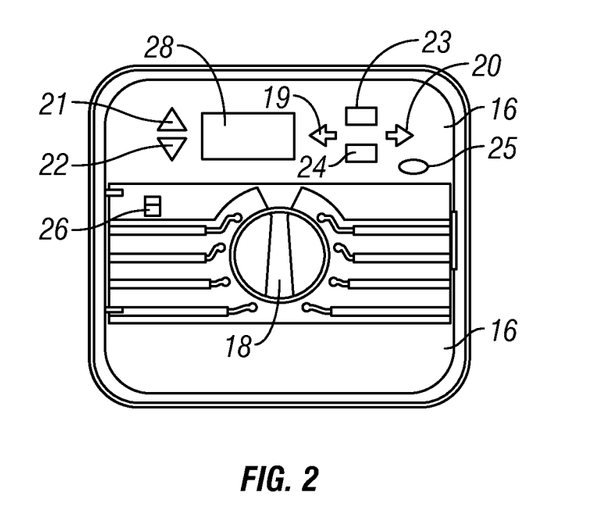
FIG. 2 is an enlarged plan view of the removable face pack of the irrigation controller of FIG. 1.
Figure 4:
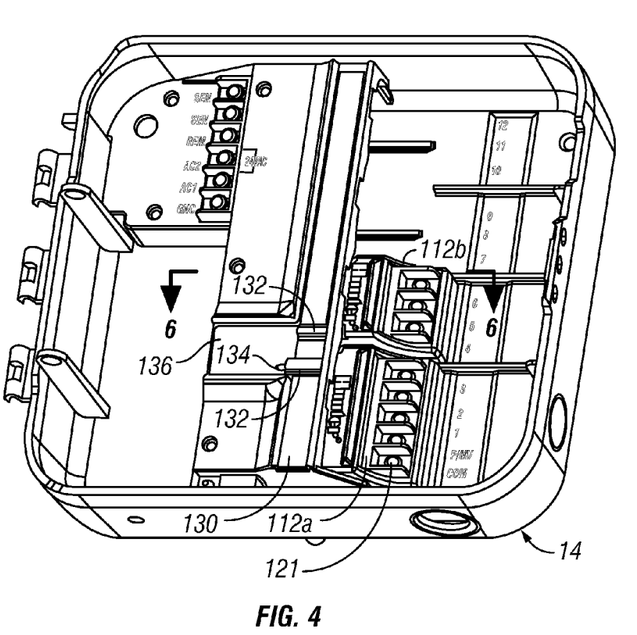
FIG. 4 is a perspective view of the back panel of the irrigation controller of FIG. 1 illustrating two station modules plugged into their respective receptacles formed in the back panel.

Referring to FIGS. 1 and 2, an irrigation controller 10 in accordance with an embodiment of the present invention includes a wall-mountable plastic housing structure in the form of a generally box-shaped front door 12 hinged along one vertical edge to a generally box-shaped back panel 14 (FIG. 4). A generally rectangular face pack 16 (FIG. 2) is removably mounted over the back panel 14 and is normally concealed by the front door 12 when not being accessed for programming. The face pack 16 has a plurality of manually actuable controls including a rotary knob switch 18 and push button switches 19, 20, 21 22, 23, 24 and 25 as well as slide switch 26. These manual controls can be manipulated in conjunction with numbers, words and/or graphic symbols indicated on a liquid crystal display (LCD) 28 for entering or selecting a watering program as is well known in the art of electronic irrigation controllers. Watering schedules or "watering programs" consisting of various run and cycle times can be entered by the user by manipulating the rotary knob switch 18 and selected ones of the push button switches 19, 20, 21 22, 23, 24 and 25. The watering program can be a complicated set of run time and cycle programs, or a portion thereof, such as a simple five minute cycle for a single station. Alternatively, existing pre-programmed watering programs can be selected, such as selected zones every other day. Still another alternative involves uploading a watering program through the SMART PORT (Trademark) feature of the irrigation controller 10.

The face pack 16 (FIGS. 1 and 2) encloses and supports a printed circuit (PC) board (not illustrated) with a processor for executing and implementing a stored watering program. An electrical connection is made between the face pack 16 and the components in the back panel 14 through a ribbon cable (not illustrated). The circuitry inside the face pack 16 can be powered by a battery to allow a person to remove the face pack 16, un-plug the ribbon cable, and walk around the lawn, garden area or golf course while entering a watering program or altering a pre-existing watering program.

Figure 3:
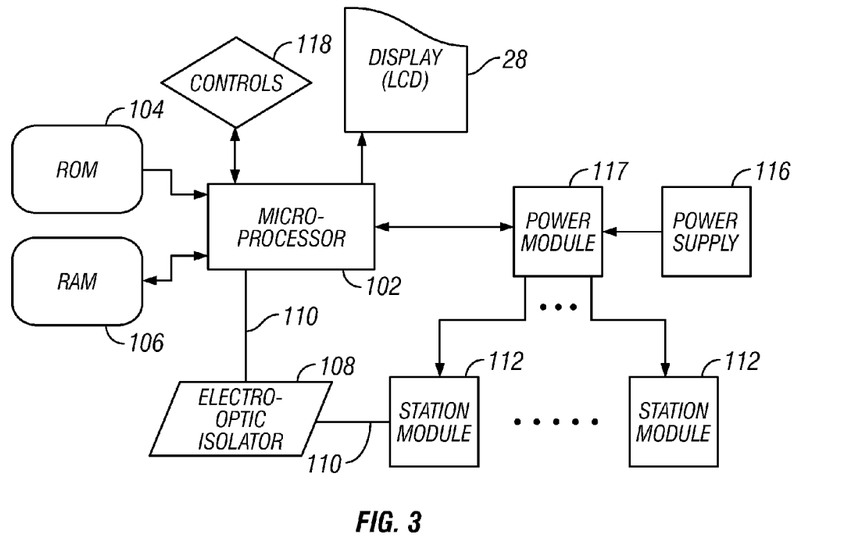
FIG. 3 is a simplified block diagram of the electronic portion of the irrigation controller of FIG. 1.

FIG. 3 is a simplified block diagram of the electronic portion of the irrigation controller 10. A processor, in the form of micro-processor 102 is mounted on the PC board mounted inside the face pack 16. The micro-processor 102 executes a watering program stored in a program memory in the form of ROM 104 using a data memory in the form of RAM 106. The micro-processor 102 may comprise a micro-controller that uses separate memory, or a micro-computer with on-chip memory that serves the same functions as the ROM 104 and RAM 106. The manually actuable controls 118 and the LCD display 28 of the controller 10 are interfaced with the micro-processor 102 in the usual fashion. The micro-processor 102 is connected through suitable input/output (I/O) devices (not illustrated), optional electro-optic isolators 108 and a bus 110 that is routed through the ribbon cable to a plurality of station modules 112. The station modules 112 are removably mounted in receptacles formed in the back panel 14. A power supply 116 located in the back panel 14 is connectable to a standard 110 volt AC source (not illustrated) and supplies electrical power to a power module 117. The power module 117 in turn supplies twenty-four volt AC power to the station modules 112 and five volt DC power to the micro-processor 102 via the ribbon cable. A master module 112a (FIG. 4) is inserted into one of the receptacles in the back panel 14 in order to control a pump or master valve (not illustrated).

The micro-processor 102 (FIG. 3) controls the station modules 112 including the master module 112a in accordance with one or more watering programs. Serial or multiplexed communication is enabled over the bus 110 so that all of the information as to which stations or zones should be turned ON and OFF at any given time is present at each receptacle. Suitable synchronous serial data and asynchronous serial data station module circuits are disclosed in the aforementioned U.S. Pat. No. 6,721,630. The station modules 112 each include a small PC board (not illustrated) which supports a station module circuit preferably including a micro-controller as well as multiple valve switching devices such as transistors or triacs for switching the twenty-four volt AC signal ON and OFF to different solenoid actuated valves (not illustrated). Typically the solenoid actuated valves are mounted in subterranean plastic boxes (not illustrated) relatively close to the controller 10. As used herein, the term "irrigation valve" includes any type of remotely controlled valve useable in an irrigation system that may or may not employ a solenoid.

FIG. 4 illustrates two station modules 112a and 112b installed in side-by-side fashion in station module receptacles formed in the back panel 14. The wider master module 112a interfaces with a pump and sensors (not illustrated). The station modules 112a and 112b have screw terminals 121 located at their rear ends for connecting the stripped ends of field valve lines (not illustrated). Each station module, such as 112b includes an outer generally rectangular plastic housing with a slot at its forward end. The small PC board that supports the station module circuit is mounted inside the housing. The station module circuit includes the micro-controller and the valve switching devices as well as conductive traces that lead to the screw terminals 121 and to four generally V-shaped spring-type electrical contacts (not illustrated) that are accessible via the slot in the forward end of the station module housing. The contacts register with corresponding electrical contacts on the underside of a relatively large PC board (not visible) mounted inside the back panel 14 when the module 112b is slid into its corresponding receptacle. The station modules 112a and 112b and the large PC board in the back panel 14 are thus electrically and mechanically connected in releasable fashion through a so-called "card edge" connection scheme when the station modules 112a and 112b are inserted or plugged into their respective receptacles.

A locking bar 130 (FIG. 4) can be manually slid up and down in FIG. 4 between unlocked and locked positions to secure and un-secure the station modules 112a and 112b after they have been fully inserted into their respective receptacles. Opposing raised projections 132 formed on the locking bar 130 facilitate sliding the locking bar 130 with a thumb. A pointer 134 extends from one of the raised projections 132 and serves as a position indicator that aligns with UNLOCKED and LOCKED indicia (not illustrated) molded into the upper surface of another plastic support structure 136 mounted inside back panel 14.

Figure 5:
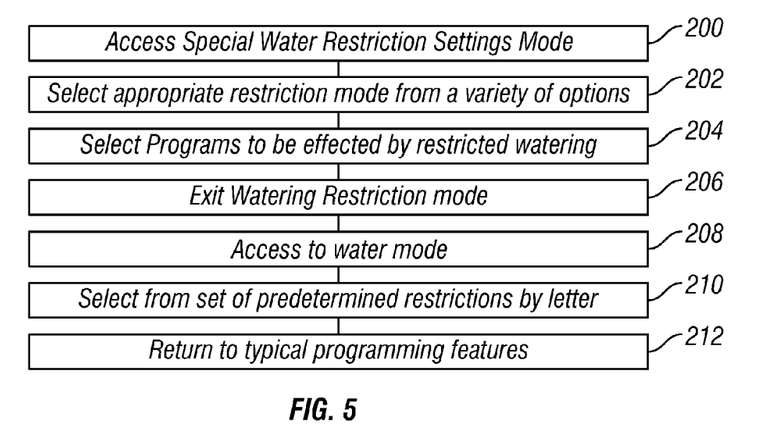
FIG. 5 is a flow chart illustrating the manner in which a user implements watering restrictions in the irrigation controller of FIG. 1.

FIG. 5 is a flow chart illustrating the manner in which a user implements watering restrictions in the irrigation controller 10. In step 200 the user manually actuates rotary knob switch 18 to access a water restriction settings mode. In step 202 the user selects the appropriate restrictions mode from a variety of options indicated on the display 28 via manual actuation of the appropriate controls 118. In step 204 the user selects the watering programs that are to be affected by the selected watering restrictions again via manual actuation of the appropriate controls 118. In step 206 the user exits the water restrictions setting mode by rotating the rotary knob switch 18 to any other position. In step 208 the user accesses the days to water mode. In step 210 the user selects from a set of predetermined watering restrictions that are designated by letter codes indicated on the display 28. The user selects the letter code of the watering restrictions assigned to it by the water district in which the irrigation controller 10 is located. In step 212 the user returns to typical operating features of the irrigation controller 10. The irrigation controller 10 will now only allow watering to be performed in time brackets previously defined by the selected watering restrictions. The days and times to restrict watering will be changed automatically by the irrigation controller 10 according to the selected watering restrictions that are pre-programmed into the irrigation controller 10.

One or more sets of watering restrictions can be pre-programmed into the irrigation controller 10 during its manufacture. The watering restrictions are preferably pre-programmed into the same integrated circuit memory in the irrigation controller 10 that stores the watering programs. When the irrigation controller 10 is initially installed, the user normally enters the current date and time. The micro-processor 102 has an electronic real time clock associated with the same so that the irrigation controller 10 can turn the valves ON and OFF at the proper times on the proper days of the week. In executing the selected watering program, which is inhibited by the selected watering restrictions, the microprocessor 102 uses date and time information that is maintained with the aid of the clock to periodically make adjustments to the watering restrictions throughout the year, as required by the water district. In a commercial form of the present invention, the irrigation controller 10 automatically restricts watering on the installation to the allowed days of the week, and will change those allowable days automatically four times per year. The real time clock has its own battery that will maintain accurate time and date information even if a nine volt battery in the irrigation controller 10 is missing or dead during a power outage. This clock helps keep the watering effectuated by the irrigation controller in sync with the watering restrictions even if there is an AC power failure.

In the preferred embodiment of the irrigation controller 10, any watering that has been selected by the user when entering or selecting a watering program that would violate the selected watering restrictions will be negated, i.e. will not take place. For example, if the watering program calls for Zone 1 to water five minutes on Friday starting at 2:00 p.m. and the watering restrictions do not allow any watering on Fridays, the micro-processor 102 will not turn the valve for Zone 1 ON at any time on Friday. In the same example, if the watering restrictions allow watering on Friday, but not between 11:00 a.m. and 7:00 p.m. the micro-processor 102 will also not turn ON Zone 1 at the time scheduled in the watering program.

The watering negated by the watering restrictions is not shifted by the irrigation controller 10 to a different time slot where it would not violate the selected watering restrictions in an attempt to deliver a given amount of water per week. This is because such shifting would typically be undesirable. For example, if the watering program selected by the user calls for five minutes watering for each station on Mondays, Wednesdays, and Fridays, and the selected watering restrictions prohibit watering on Fridays, the irrigation controller 10 will not turn ON any valves on Fridays. Nor will the irrigation controller automatically shift the Friday watering to Tuesday, for example, as this may be the day the homeowner has scheduled for lawn cutting. Since the irrigation controller 10 does not automatically shift water run times from prohibited time blocks to permitted time blocks in an attempt to maintain a predetermined water budget, the user may be required to modify the watering program in a manner that makes up for the lost watering negated by the watering restrictions yet still complies with the same in order to maintain the optimum health of the landscaping.

Step 200 in FIG. 5, namely, ACCESS SPECIAL WATER RESTRICTION SETTINGS MODE, may be a "hidden function" of the irrigation controller 10, i.e. there may be no position for rotary knob switch 18 that is specifically dedicated to this part of the irrigation controller 10. There can be many hidden functions that are used to initially set up the irrigation controller 10 but do not need to be accessed for normal use afterwards. A special sequence of push button and rotary dial manipulation can access these hidden functions, e.g. holding down two push buttons, twisting rotary knob 18 from 'Run' to 'Set Days to Water', and then releasing the push buttons. The hidden function aspect of selecting the water restrictions prevents the user from de-activating or removing the water restrictions. The water restriction settings mode could be accessed any number of other ways, including a menu process, a position of the rotary knob switch 18, a push button dedicated to its access, or other direct and indirect ways.

In step 202 in FIG. 5, namely, SELECT APPROPRIATE RESTRICTION MODE FROM A VARIETY OF OPTIONS, the user selects a pre-programmed watering restrictions. These can include complex schedules as defined by a water district that include days of the week during which watering is, or is not, permitted, as well as hours of the day during which watering is, or is not, permitted, and permutations and combinations of such prohibitions.

Figure 6:
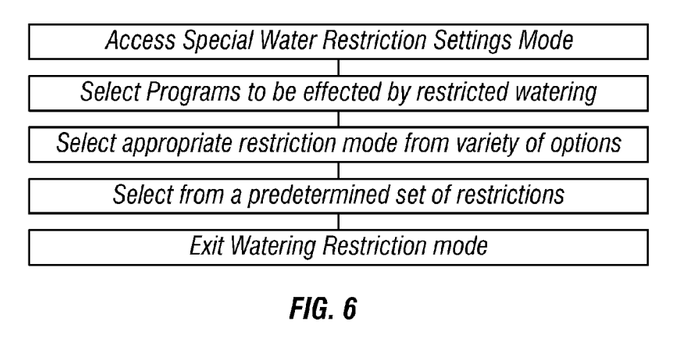
FIGS. 6 and 7 are flow charts illustrating alternate ordering of functions in the selection and implementation of watering restrictions.
Figure 7:
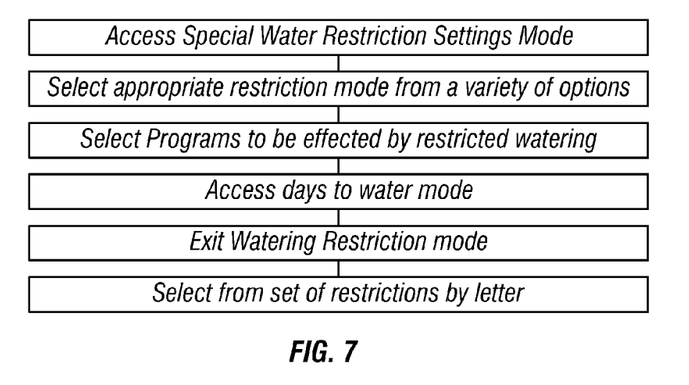

In one example, the user may select a particular water district. Where there is only one water district available, only the numbers 0 and 1 may be indicated on the display 28 as possible choices. Selecting 1 can select, for example, the Southern Nevada Water Authority. The water districts could be identified by letter, number, a series of letters, a series of numbers, or the combination of both. The water district options could be selected from a menu that spells out the names of the different water districts. Further, as more water districts impose watering restrictions, the irrigation controller 10 could be modified to require additional steps in the sequence to make the water district selection. The user could first be required to sort by the first letter, or by state, or by other region prior to selecting the water district. For example to find the Southern Nevada Water authority, the user might first select the letter 'S' prior to selecting the individual water district, or the user might select "NV" which is the abbreviation for the State of Nevada. The user might then select the appropriate water district within Nevada. The selection of watering restrictions by the user can be placed in a different order of events as illustrated in, but not limited by, FIGS. 6 and 7.

In step 204 in FIG. 5, namely, SELECT PROGRAMS TO BE EFFECTED BY RESTRICTED WATERING, the user can choose which watering programs that are to be limited by the watering restrictions. For example, this can be a selection from program A, programs A and B, or programs A, B and C. The reason for including this capability is to meet various requirements of the watering restrictions as well as the flexibility of the irrigation controller 10. As an example, drip irrigation may be exempt from the watering restrictions. It can be used at different times, and therefore the user will want at least one program available to schedule any drip zones. New lawns and new plants may also be exempt to allow them time to get established and therefore they need to be managed in a different way to allow extra watering outside normal restrictions for a period of thirty days.

Some users may want to control their outdoor lighting or other non-irrigation features, such as an electric fountain, using the irrigation controller 10. In these situations the user may want one or more watering programs available for these functions that also may also be exempt from the watering restrictions. The programming of the irrigation controller 10 can include the option to select more program options. The function of selecting which watering programs are subject to the irrigations restrictions may be placed in a different order of events as illustrated in, but not limited by, FIGS. 6 and 7.

Step 206 in FIG. 5, namely, EXIT WATER RESTRICTION MODE, may or may not be required at this point in the programming sequence, or at all for that matter.

Step 208 in FIG. 5, namely, ACCESS DAYS TO WATER MODE, is the step in which the user can select specific group watering restrictions. The irrigation controller 10 may be pre-programmed with different group watering restrictions, designated A-F, that may be conveniently selected by the user.

Step 210 in FIG. 5, namely, SELECT FROM SET OF PREDETERMINED RESTRICTIONS BY LETTER, involves accessing the days-to-water field. In the preferred embodiment, the display 28 can indicate, for example, that the current water district setting is 'A' when entering the field for the first time. Pressing the plus or minus pushbuttons 21 or 22 can change the water district setting up or down one letter at a time until the user reaches the letter that corresponds with the users assigned group. Once the user enters the letter associated with the desired water district, the irrigation controller 10 appropriately restricts watering to the predetermined days and times. The irrigation controller 10 can allow for the selection of the watering group by letters, numbers, a series of each or a combination of both. It is possible for the selection process to be accomplished with user interface tools such as dials, buttons, keyboards, or a combination thereof. This function may be included in the water restriction mode so all information is entered in one place. As irrigation controllers and user interfaces evolve in flexibility and capacity, this function can be located where it is easiest for the user.

Figure 8:
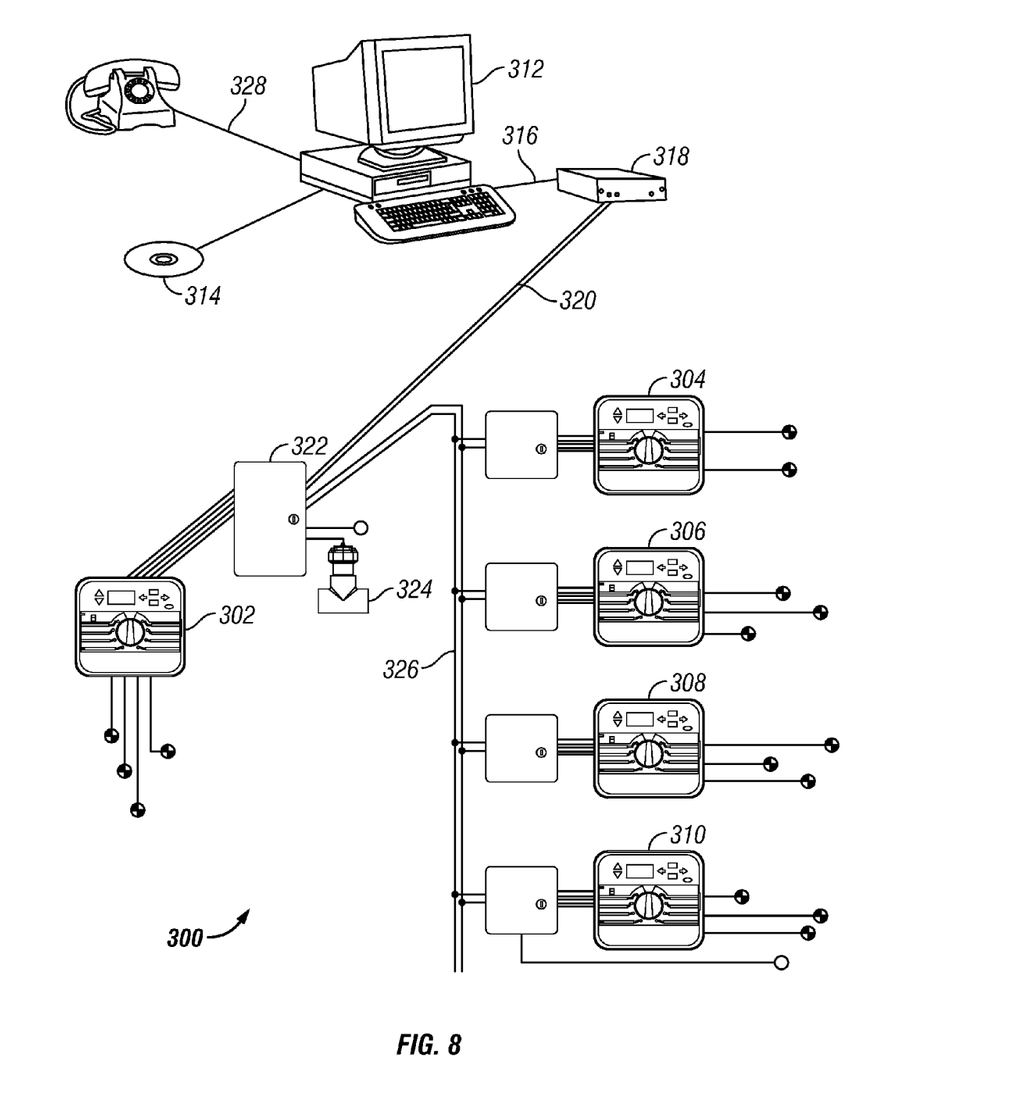
FIG. 8 illustrates an alternate embodiment of the present invention in the form of a PC-based irrigation management system.

FIG. 8 illustrates an alternate embodiment 300 of the present invention in which a plurality of irrigation controllers 302, 304, 306, 308 and 310 on different irrigation sites are managed by a personal computer (PC) 312 running a specialized irrigation water management application program recorded on a disk 314. One suitable commercially available application program is the Hunter Irrigation Management and Monitoring System (IMMS). The PC 312 is connected via computer cable 316, central computer communication unit 318 and twisted pair cable 320 to site interface 322. The site interface unit 322 is connected to a flow sensor 324 and to the irrigation controller 302. The irrigation controllers 304, 306, 308 and 310 are connected via twisted pair cable 326 to the site interface unit 322. The PC 312 is connected to the Internet via internal modem and phone line 328, cable modem (not illustrated) or wireless Internet connection to allow downloading of current watering restrictions from water districts and local evapotranspiration (ET) data from the National Weather Service or other sources. The cables illustrated in FIG. 8 can be replaced by any one of, or a combination of, other communications links such as radio frequency (RF), conventional telephone, cellular telephone, Ethernet, and other well-known communications links.

In managing different irrigation sites through the PC 312 (FIG. 8), the watering program is selected by the user via point-and-click menus, and then the watering restrictions described above are also implemented by the user via point-and-click menus. The fields for selecting the watering restrictions can be much more descriptive in the PC environment. For example, the user can select the actual name of the water district. The user can also select the water district directly or from a graphic menu. Selecting a location from a map can also impose the watering restrictions. The PC 312 can manage watering at multiple geographically disperse sites that are subject to different watering restrictions.

Persons skilled in the art of irrigation controllers will appreciate that the present invention also provides novel a method of watering turf and/or landscaping in order to conserve water. In one embodiment, the method includes the steps of providing a stand-alone irrigation controller having a plurality of manually actuable controls; entering or selecting a watering program via the manually actuable controls; selecting pre-programmed watering restrictions via the manually actuable controls that disable portions of the watering otherwise effectuated by the watering program; and watering turf and/or landscaping by having a processor in the irrigation controller turn a plurality of valves ON and OFF in accordance with the watering program as inhibited by the selected watering restrictions. It will be understood that the order of the steps of entering or selecting the watering program on the one hand, and selecting pre-programmed watering restrictions on the other hand, can be inverted.

While an embodiment of a stand-alone irrigation controller with selectable watering restrictions, a PC-based irrigation management system that implements watering restrictions, and a novel method of watering turf and/or landscaping to conserve water, have been described, it will be apparent to those skilled in the art that the subject invention can be further modified in arrangement and detail. For example, the stand-alone irrigation controller 10 need not have a modular configuration with removable station modules. The irrigation controller 10 could be configured to operate with decoder technology instead of requiring each valve to be separately connected to a dedicated station circuit in a station module, or permanently built into the controller. The irrigation controller 10 could have a hybrid modular/decoder configuration as disclosed in U.S. Pat. No. 7,069,115. The irrigation controller 10 could allow for a manual bypass of the irrigation restrictions for the limited purpose of testing individual stations. The stand-alone irrigation controller could function without a control panel in place as set forth in the aforementioned U.S. patent application Ser. No. 11/458,551. Therefore, the protection afforded our invention should only be limited in accordance with the scope of the following claims.

What is claimed is:

1. An irrigation controller, comprising:
   a computer processor;
   a memory operatively connected to the computer processor, said computer processor configured to execute programs stored in the memory, said memory further storing a watering restriction, said watering restriction comprising at least one day of a week permitting watering and at least one day of the week restricting watering, said watering restriction further comprising changes to the at least one day of the week permitting watering and the at least one day of the week restricting watering, the changes occurring at least once during a year, wherein said watering restriction is pre-programmed;
   at least one manually actuable control operatively connected to the computer processor that allows a user to enter at least two watering schedules including run times, and to select from the at least two watering schedules at least one affected watering schedule that is affected by the watering restriction and at least one non-affected watering schedule that is not affected by the watering restriction;
   circuitry operatively connected to the computer processor and configured to turn a plurality of valves ON and OFF; and
   programming stored in the memory to accept input from the user via the at least one manually actuable control to implement the at least two watering schedules, wherein during said run times, the computer processor operates ones of the plurality of valves, the programming further accepting input from the user via the at least one manually actuable control to implement the affected watering schedule and the non-affected watering schedule, the programming automatically prohibiting operation of the ones of the plurality of valves during one or more run times of the affected watering schedule according to watering restriction and automatically permitting operation of the ones of the valves during one or more run times of the non-affected watering schedule regardless of the watering restriction.

2. The irrigation controller of claim 1 wherein the programming allows the user to optionally select whether any of the watering restrictions are to apply.

3. The irrigation controller of claim 1 wherein the watering restriction comprises different watering restrictions corresponding to different water districts.

4. The irrigation controller of claim 1 wherein the at least one non-affected watering schedule is associated with at least one of an electric fountain, lighting, drip irrigation, new lawns, and new plants.

5. The irrigation controller of claim 1 wherein the watering restriction comprises a set of different watering restrictions corresponding to different groups within a water district.

6. The irrigation controller of claim 1 wherein the watering restriction comprises a set of watering restrictions and the programming allows the user to select the watering restriction from the set of watering restrictions before entering the at least two watering schedules.

7. The irrigation controller of claim 1 wherein the watering restriction comprises a set of watering restrictions and the programming allows the user to select the watering restriction from the set of watering restrictions after entering the at least two watering schedules.

8. The irrigation controller of claim 1 wherein the watering restrictions includes hours during which watering is, or is not, permitted.

9. A method of watering turf and/or landscaping in order to conserve water, comprising the steps of:
   providing an irrigation controller having a processor and at least one manually actuable control;
   entering or selecting at least two watering programs via the manually actuable control;
   selecting at least one affected watering program from the at least two watering programs via the manually actuable control;
   selecting at least one non-affected watering program from the at least two watering programs via the manually actuable control;
   selecting a pre-programmed watering restriction from a set of pre-programmed watering restrictions via the manually actuable control, each pre-programmed watering restriction having a watering schedule that includes at least days of a week on which watering is, or is not, permitted and further wherein at least the permitted days of the week or the not permitted days of the week are pre-programmed to change at least once during a year, wherein said affected watering program is affected by the pre-programmed watering restriction, and wherein said non-affected watering program is not affected by the pre-programmed watering restriction;
   watering turf and/or landscaping by selectively turning a power signal ON to a plurality of valves that deliver water to a plurality of sprinklers in accordance with the at least one non-affected watering program and the at least one affected watering program;

automatically permitting operation of ones of the plurality of valves during one or more run times of the non-affected watering program regardless of the pre-programmed watering restriction; and automatically prohibiting operation of ones of the plurality of valves during one or more run times of the affected watering program according to the not permitted days of the week of the pre-programmed watering restriction.

10. The method of claim 9 wherein selecting the pre-programmed watering restriction comprises selecting a group that has been assigned to an irrigation site by a water district in which the irrigation controller has been installed.

11. The method of claim 9 wherein each of the pre-programmed watering restrictions includes hours during which watering is, or is not, permitted.

12. An irrigation controller, comprising:

a computer processor;

a memory forming a part of the computer processor or operatively connected to the computer processor;

at least one manually actuable control that allows a user to enter at least two watering programs that effectuate watering and to select at least one affected watering program and at least one non-affected watering program from the at least two watering programs;

circuitry controlled by the computer processor that is configured to turns a plurality of valves ON and OFF;

programming stored in the memory that allows the user to select a predetermined set of watering restrictions from a plurality of different sets of watering restrictions, each predetermined set of watering restrictions being pre-programmed to change at least once throughout a year;

the programming implementing the at least one non-affected watering program by automatically permitting operation of ones of the plurality of valves during one or more run times of the at least one non-affected watering program regardless of the predetermined set of watering restrictions; and the programming implementing the at least one affected watering program by automatically disabling operation of ones of the plurality of valves during one or more run times of the at least one affected watering programs according to the predetermined set of watering restrictions.

13. The irrigation controller of claim 12 wherein the programming allows the user to optionally select whether any of the selected set of watering restrictions are to apply.

14. The irrigation controller of claim 12 wherein the different sets of watering restrictions correspond to different water districts.

15. The irrigation controller of claim 12 wherein the watering restrictions are selected from the group consisting of days of a week on which watering is permitted, days of the week on which watering is not permitted, hours of the day during which watering is permitted, and hours of the day during which watering is not permitted.

16. The irrigation controller of claim 12 wherein the watering restrictions include watering intervals.

17. The irrigation controller of claim 12 wherein the different sets of watering restrictions correspond to different groups within a water district.

18. The irrigation controller of claim 12 wherein the programming allows the user to select the watering restrictions before entering the at least two watering programs.

19. The irrigation controller of claim 13 wherein the programming allows the user to select the watering restrictions after entering the at least two watering programs.

* * * * *

UNITED STATES PATENT AND TRADEMARK OFFICE
CERTIFICATE OF CORRECTION

PATENT NO. : 8,700,222 B1
APPLICATION NO. : 12/042301
DATED : April 15, 2014
INVENTOR(S) : Woytowitz et al.

It is certified that error appears in the above-identified patent and that said Letters Patent is hereby corrected as shown below:

In the Specification

In column 1 at line 21, Change "Friday." to --Friday,--.

In the Claims

In column 10 at line 37, In Claim 8, change "restrictions" to --restriction--.

In column 11 at line 26, In Claim 12, change "turns" to --turn--.

Signed and Sealed this
Twenty-third Day of September, 2014

Michelle K. Lee
*Deputy Director of the United States Patent and Trademark Office*